(12) United States Patent
Shand et al.

(10) Patent No.: US 8,111,616 B2
(45) Date of Patent: Feb. 7, 2012

(54) CONSTRUCTING A REPAIR PATH IN THE EVENT OF FAILURE OF AN INTER-ROUTING DOMAIN SYSTEM LINK

(75) Inventors: Mike Shand, Cobham (GB); Stewart F. Bryant, Merstham (GB); Gargi Nalawade, San Jose, CA (US); Robert Raszuk, Komorow (PL); Keyur Patel, San Jose, CA (US); Stefano B. Previdi, Rome (IT); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 833 days.

(21) Appl. No.: 11/518,405

(22) Filed: Sep. 8, 2006

(65) Prior Publication Data
US 2008/0219153 A1 Sep. 11, 2008

(51) Int. Cl.
*G01R 31/08* (2006.01)
*G06F 11/00* (2006.01)

(52) U.S. Cl. ...................................... 370/225
(58) Field of Classification Search ................. 370/225, 370/216
See application file for complete search history.

(56) References Cited

U.S. PATENT DOCUMENTS

| | | | |
|---|---|---|---|
| 5,953,312 A | 9/1999 | Crawley et al. | |
| 5,959,968 A | 9/1999 | Chin et al. | |
| 6,032,194 A | 2/2000 | Gai et al. | |
| 6,148,410 A | 11/2000 | Baskey et al. | |
| 6,438,100 B1 | 8/2002 | Halpern et al. | |
| 6,463,061 B1 | 10/2002 | Rekhter et al. | |
| 6,778,492 B2 | 8/2004 | Charny et al. | |
| 6,934,763 B2 | 8/2005 | Kubota et al. | |
| 6,981,055 B1 * | 12/2005 | Ahuja et al. | 709/238 |
| 6,996,084 B2 * | 2/2006 | Troxel et al. | 370/338 |
| 7,177,295 B1 | 2/2007 | Sholander et al. | |
| 7,181,533 B2 | 2/2007 | D'Souza et al. | |
| 7,197,040 B2 | 3/2007 | Bressoud et al. | |
| 7,209,975 B1 | 4/2007 | Zang et al. | |
| 7,215,644 B2 | 5/2007 | Wu et al. | |
| 7,233,593 B2 | 6/2007 | Chavali | |
| 7,236,575 B2 | 6/2007 | Kim et al. | |
| 7,355,983 B2 | 4/2008 | Scudder et al. | |
| 7,359,393 B1 | 4/2008 | Nalawade et al. | |
| 7,406,035 B2 | 7/2008 | Harvey et al. | |
| 7,408,941 B2 | 8/2008 | Martini et al. | |
| 7,420,958 B1 | 9/2008 | Marques | |

(Continued)

OTHER PUBLICATIONS

Anonymous, "IS-IS, Intermediate System-to-Intermediate System, ISO 10589," NetworkSorcery.com, downloaded May 21, 2007, pp. 1-4.

(Continued)

*Primary Examiner* — Derrick W Ferris
*Assistant Examiner* — Angel Brockman
(74) *Attorney, Agent, or Firm* — Hickman Palermo Truong & Becker LLP (57) ABSTRACT

An apparatus and method as described for constructing a repair path for use in the event of failure of an inter-routing domain connection between respective components in first and second routing domains of a data communications network. The apparatus is arranged to assign a propagatable repair address for use in the event of failure of the inter-routing domain connection and to propagate the repair address via data communications network components other than the inter-routing domain connection.

25 Claims, 5 Drawing Sheets

U.S. PATENT DOCUMENTS

| | | |
|---|---|---|
| 7,420,989 B2 | 9/2008 | Liu et al. |
| 7,480,253 B1 | 1/2009 | Allan |
| 7,483,387 B2 | 1/2009 | Guichard et al. |
| 7,502,332 B1 | 3/2009 | Chen |
| 7,535,826 B1 | 5/2009 | Cole et al. |
| 7,590,074 B1 | 9/2009 | Dondeti et al. |
| 7,697,439 B2 | 4/2010 | Martini et al. |
| 7,733,876 B2 | 6/2010 | Davie et al. |
| 7,787,396 B1 | 8/2010 | Nalawade et al. |
| 7,801,030 B1 | 9/2010 | Aggarwal et al. |
| 2002/0093954 A1 | 7/2002 | Weil et al. |
| 2003/0117950 A1 | 6/2003 | Huang |
| 2003/0142682 A1 | 7/2003 | Bressoud et al. |
| 2003/0202473 A1 | 10/2003 | Patrick et al. |
| 2003/0233595 A1* | 12/2003 | Charny et al. ............ 714/4 |
| 2004/0090913 A1 | 5/2004 | Scudder et al. |
| 2004/0213233 A1 | 10/2004 | Hong et al. |
| 2004/0260825 A1* | 12/2004 | Agarwal et al. ......... 709/230 |
| 2005/0007950 A1 | 1/2005 | Liu |
| 2005/0013241 A1 | 1/2005 | Beller et al. |
| 2005/0097219 A1 | 5/2005 | Goguen et al. |
| 2005/0201371 A1 | 9/2005 | Lauer |
| 2005/0265228 A1 | 12/2005 | Fredette et al. |
| 2005/0265258 A1 | 12/2005 | Kodialam et al. |
| 2006/0029035 A1* | 2/2006 | Chase et al. ............ 370/351 |
| 2006/0140190 A1* | 6/2006 | Lee ...................... 370/395.3 |
| 2006/0187819 A1* | 8/2006 | Bryant et al. .......... 370/216 |
| 2006/0193247 A1 | 8/2006 | Naseh et al. |
| 2006/0209716 A1 | 9/2006 | Previdi et al. |
| 2006/0239201 A1 | 10/2006 | Metzger et al. |
| 2006/0291446 A1 | 12/2006 | Caldwell et al. |
| 2007/0011351 A1* | 1/2007 | Bruno et al. ............ 709/238 |
| 2007/0025270 A1 | 2/2007 | Sylvain |
| 2007/0041379 A1* | 2/2007 | Previdi et al. .......... 370/392 |
| 2007/0064702 A1 | 3/2007 | Bates et al. |
| 2007/0091796 A1 | 4/2007 | Filsfils et al. |
| 2007/0180311 A1* | 8/2007 | Harvey et al. ........... 714/13 |
| 2007/0214275 A1 | 9/2007 | Mirtorabi et al. |
| 2007/0214290 A1* | 9/2007 | Yamaguchi ............. 710/25 |
| 2007/0260746 A1 | 11/2007 | Mirtorabi et al. |
| 2008/0008104 A1 | 1/2008 | Previdi et al. |
| 2008/0025203 A1 | 1/2008 | Tallet |
| 2008/0089227 A1 | 4/2008 | Guichard et al. |
| 2010/0287305 A1 | 11/2010 | Kompella |

OTHER PUBLICATIONS

R. Callon, "Use of OSI IS-IS for Routing in TCP/IP and Dual Environments," Internet Engineering Task Force (IETF) Request for Comments (RFC) 1195, Dec. 1990, pp. 1-70.

D. Oran, "OSI IS-IS Intra-domain Routing Protocol" [republication of ISO 10589], IETF RFC 1142, Feb. 1990, 179 pages (see esp. pp. 21-24).

Y. Rekhter et al., "A Border Gateway Protocol 4 (BGP-4)," IETF RFC 1771, Mar. 1995, pp. 1-47.

O. Bonaventure et al., "Ordered convergence and fast reroute for BGP peering links," presentation to Department of Information Engineering, Catholic University of Louvain (UCL) (Belgium), Nov. 22, 2005, 52 pp. (see esp. p. BGP-FRR-52).

Rosen, E., et al., "BGP/MPLS VPNs", Network Working Group Request for Comments: 2547, Mar. 1999, pp. 1-24.

Gummadi, K. P., et al., "Improving the Reliability of Internet Paths with One-hop Source Routing", USENIX Association, OODI '04: 6th Symposium on Operating Systems Design and Implementation, Dec. 6-8, 2004, pp. 183-197.

"Fast Scoped Rerouting for BGP", International Conference on Networks, IEEE, Sep. 2003, pp. 25-30.

Lichtwald, et al., "Fast Scoped Rerouting for BGP", ICON 2003, Institute of Telematics, University of Karlsruhe, Germany, pp. 1-15.

Walton, D., et al., "Advertisement of Multiple Paths in BGP (draft-walton-bgp-add-paths-03.txt)", Network Working Group Internet Draft, Jul. 2005, pp. 1-8.

U.S. Appl. No. 11/254,469, filed Oct. 20, 2005, entitled A Method for Constructing a Backup Path in an Autonomous System, by Clarence Filsfils, et al.

U.S. Appl. No. 11/254,609, filed Oct. 20, 2005, entitled A Method of Implementing a Backup Path in an Autonomous System, by Clarence Filsfils, et al.

U.S. Appl. No. 11/254,468, filed Oct. 20, 2005, entitled Method and Apparatus for Managing Forwarding of Data in an Autonomous System, by Clarence Filsfils, et al.

U.S. Appl. No. 10/340,371, filed Jan. 9, 2003, entitled Method and Apparatus for Constructing a Backup Route in a Data Communications Network, by Kevin George Miles, et al.

State Intellectual Property Office of the People's Republic of China, "The First Office Action", filing No. 200680001652.0, May 8, 2009, 15 pages.

Claims, filing No. 200680001652.0, 4 pages.

European Patent Office, "Supplementary European Search Report", application No. EP 06720965, dated Jul. 21, 2009, 6 pages.

Claims, application No. EP 06720965, 4 pages.

U.S. Appl. No. 11/064,275, filed Feb. 22, 2005, Office Action, Mailing Date Mar. 3, 2010.

U.S. Appl. No. 11/518,383, filed Sep. 8, 2006, Final Office Action, Mailing Date May 13, 2010.

CN $2^{nd}$ Office Action CN application No. 200680001652.0 dated Oct. 27, 2010.

Current claims for CN application No. 200680001652.0.

* cited by examiner

CONSTRUCTING A REPAIR PATH IN THE EVENT OF FAILURE OF AN INTER-ROUTING DOMAIN SYSTEM LINK

FIELD OF THE INVENTION

The present invention generally relates to construction of repair paths. More specifically the present invention relates to an apparatus and method for constructing a repair path in the event of failure of an inter-routing domain link.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One routing protocol used, for example, in the internet is Border Gateway Protocol (BGP). BGP is used to route data between routing domains such as autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in the form of an IP address prefix, the next-hop attribute comprises the IP address used to reach the BGP router.

Edge or border BGP routers (ASBRs) in a first AS communicate with eBGP peers in a second AS via exterior BGP (eBGP). In addition BGP routers within an AS exchange reachability information using interior BGP (iBGP). As a very large number of routes may be advertised in this manner an additional network component comprising a route reflector is commonly provided which sets up a session with each BGP router and distributes reachability information to each other BGP router.

The border routers in respective AS's can advertise to one another, using eBGP, the prefixes (network destinations) reachable from them, the advertisements carrying information such as AS-path, indicating the AS's through which the route advertisement has passed including the AS in which the advertising border router itself is located, and a BGP Community attribute indicating the manner in which the advertisement is to be propagated. For example if an eBGP advertisement is received with Community attribute No-Advertise, then the border router receiving the advertisement does not advertise the route information to any of its peers, including other routers in its AS. When the routes are advertised internally, additional information such as a local preference and a nexthop field are included. The local preference attribute sets a preference value to use of that particular route for example for a given set of prefixes such that where more than one route is available to other border routers in the AS they will select the route with the highest local preference. The next-hop attribute provides the IP address used for the link between the border router in the AS and its eBGP peer.

Based on the eBGP information received, an ASBR selects its path to another AS. This is done either by forwarding packets for a prefix towards a peer in an adjacent AS which advertised the prefix via eBGP as reachable, to another ASBR in the same AS which advertised the prefix via IBGP as reachable or if appropriate to a router without the AS to which the prefix is attached. Based on the eBGP information received for each prefix from ASBRs in adjacent ASs, an ASBR selects its path for those packets by choosing the ASBR with the "best" path. As reachability is passed from AS to AS, information is added to express the list of ASs that the packet to that prefix would pass through to reach its destination. Accordingly, BGP belongs to the family of routing vector protocols, the path being constructed back via the chain of propagation of the advertised prefix.

To reduce the amount of IBGP messages further, route reflectors may only advertise the best path for a given destination to all border routers in an AS. Accordingly all border routers will forward traffic for a given destination to the border router identified in the best path advertisement. Forwarding of packets within the AS may then simply use Interior Gateway Protocol (IGP) as described in more detail below where the IGP forwarding table will ensure that packets destined for the eventual destination will be forwarded within the AS towards the appropriate border router. Alternatively an ingress border router receiving incoming packets may tunnel the packets to the appropriate egress border router, that is, encapsulate the packets to a destination egress border router for transit across the AS for example using IP or MPLS tunnels. The packets are then decapsulated at the egress border router and forwarded according to the packet destination header.

Within each AS the routing protocol typically comprises an interior gateway protocol (IGP) for example a link state protocol such as open shortest path first (OSPF) or intermediate system-intermediate system (IS-IS).

It is important to minimize packet loss in the case of network component failure. For example an inter domain (eBGP) failure may occur in the case of failure of an inter-AS connection between respective components in first and second ASs of a data communications network. Solutions are described in co-pending patent application Ser. Nos. 11/254,469, filed Oct. 20, 2005; 11/254,609, filed Oct. 20, 2005; and 11/254,589, filed Oct. 20, 2005, the entire contents of which are incorporated by reference for all purposes as if fully set forth herein. According to those approaches, a connection between ASBRs can be repaired if there is an inter-AS link between a second pair of ASBRs between the ASs under consideration. However, the approach is described therein to not support repair in the general case where there is any alternate path between a pair of adjacent ASs including indirect paths via additional ASs.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

An apparatus and method for constructing a repair path for use in the event of failure of an inter-AS connection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for constructing a repair path
4.0 Implementation Mechanisms-Hardware Overview
5.0 Extensions and Alternatives
1.0 General Overview The needs identified in the foregoing Background, and other needs and objects that will become apparent from the following description, are achieved in the present invention, which comprises, in one aspect an apparatus for constructing a repair path for use in the event of failure of an inter-routing domain connection between respective components in first and second routing domains of a data communications network. The apparatus is arranged to assign a propagatable repair address for use in the event of failure of the inter-routing domain connection. The apparatus is further arranged to propagate the repair address via data communications network components other than the inter-routing domain connection.

In other aspects, the invention encompasses a computer apparatus and a computer-readable medium configured to carry out the foregoing steps.

2.0 Structural and Functional Overview

Figure 1:
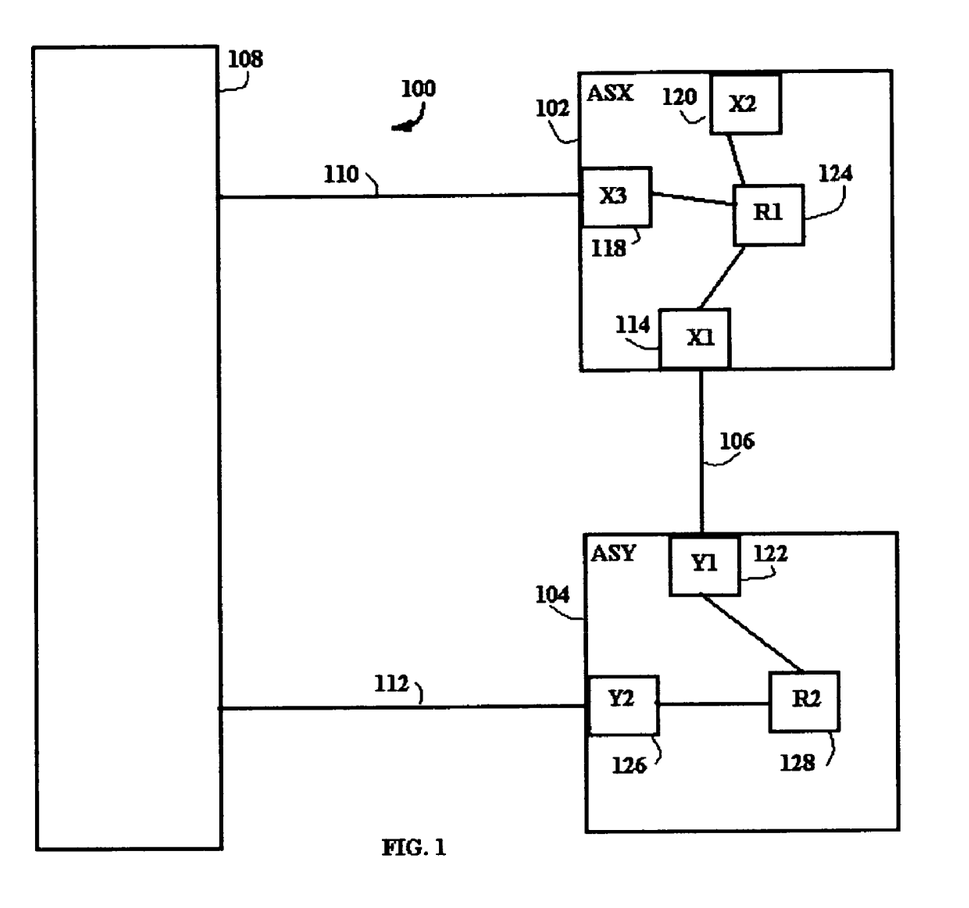
FIG. 1 is a representation of a network repairable according to the present approach.
Figure 2:
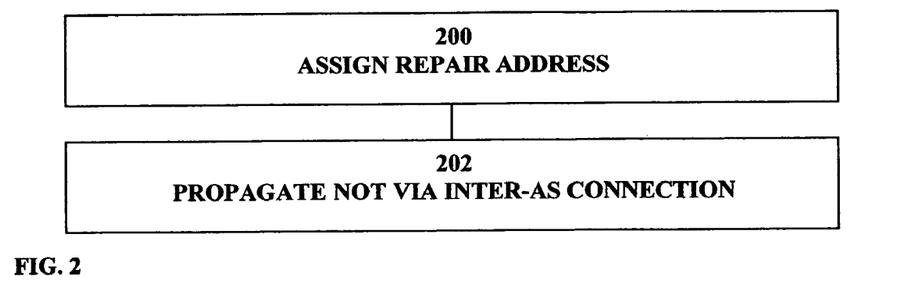
FIG. 2 is a flow diagram illustrating at a high level the steps performed according to the apparatus and method described herein.

In overview the method and apparatus described herein can be understood with reference to FIG. 1 which depicts a network to which the apparatus and method may be applied and FIG. 2 which is a flow diagram illustrating the steps performed according to the approach.

Referring firstly to FIG. 1 a data communication network is designated generally 100 and includes a routing domain such as an autonomous system ASX reference numeral 102 and an autonomous system ASY reference numeral 104. ASX and ASY are connected via an inter-AS link 106 and are further connected to the remainder of the network designated generally 108 by respective inter-AS links 110, 112. ASX includes a repairable ASBR X1, reference numeral 114 and further ASBRs X2 and X3 reference numerals 118, 120. ASBR X1 forms an inter-AS connection via inter-AS link 106 with an ASBR Y1, reference 122, in ASY. ASBR X3 forms an inter-AS connection with a network 108 and ASBR X2 is a further inter-AS connectable component. ASX also includes a plurality of routers of which one is shown for purposes of ease of understanding, router R1 reference numeral 124.

In addition to ASBR Y1, a further ASBR Y2 reference numeral 126 is provided in ASY providing an inter-AS connection with the network 108 via inter-AS link 112. ASY further includes a plurality of routers of which only one is shown for the purposes of ease of understanding, router R2 reference 128.

In normal operation ASBR peers such as X1 and Y1 exchange reachability information such as the network addresses (prefixes) which they can reach. The reachability information is propagated internally within each AS, for example via a route reflector (not shown) such that other ASBR's in the AS are able to update their forwarding information. In addition routers within the AS are able to update their forwarding information for forwarding traffic within the AS using IGP.

According to the approach described herein, a repair path is constructed for use in the event of failure of an inter-AS connection for example between ASBR X1 and Y1 via link 106. Failure of the connection may occur, for example, because of failure of the inter-AS link 106 or repairable ASBR X1. In either case the repairing ASBR Y1 must send packets that previously would have traversed the failed connection via the repair path.

Accordingly at step 200 node X1 creates a repair tunnel end point and assigns it a repair address for use in the event of failure of the inter-AS connection. At step 202 the repair address is advertised by node X1 in iBGP and in all nodes eBGP to all peers except between nodes X1 and Y1. Reachability information for the repair address thus propagates through ASX and, via ASBR X3, network 108 and ASBR Y2 in ASY, into ASY (assuming that such alternate reachability exists). Because the repair address is propagated via data connection network components X3, Y2 and other components in network 108 which are not shown, but not the inter-AS connection 106, the reachability has the property that the packet sent to the repair address will follow the path determined by the iBGP/eBGP propagation of the repair address and in particular will reach ASBR via a path that is not via the link 106. Hence link protection for the link 106 is obtained relying on the properties of an external gateway protocol such as BGP.

ASBR Y1 is configured (for example by static configuration or any other appropriate means) to implement the repair in the event of failure of the inter-AS connection. In that case it can tunnel the packet to the IP repair address for example via router R2, ASBR Y2, network 108, ASBR X3 and router R1 to ASBR X1. ASBR X1 will then decapsulate the tunnel packet and forward it as normal as though received over link 106.

It will be noted that the approach described herein can be extended to encompass failure of the inter-AS connection in a form of failure of a link 106 or ASBR X1. As described in more detail below, in that case ASBR X1 employs the assistance of another ASBR within ASX as a helper, for example ASBR X3, on the assumption that as long as the packet reaches an ASBR in ASX, then it is closer to the destination and can hence be forwarded to the destination. ASBR X3 creates a tunnel end point for the repair of X1 and advertises reachability to this address in both iBGP and eBGP. The other ASBR's excepting ASBR X1, also advertise reachability to the repair address. As a result the repair path once again does not include ASBR X1, using the BGP routing protocol to form the repair path. Hence when ASBR Y1 detects failure of the inter-AS connection it will tunnel repair packets to ASBR X3 via router R2, ASBR Y2, and network 108 to ASBR X3 where the packet will be decapsulated and forwarded through ASX using normal forwarding to the packet address which can be internal for ASX or to another AS for example via further ASBR X2.

As a result of the approach described herein, a mechanism is provided for repair in the case of failure of inter-AS links where any path is available including indirect paths via multiple intermediate ASs.

3.0 Apparatus and Method for Constructing a Repair Path

Figure 3:
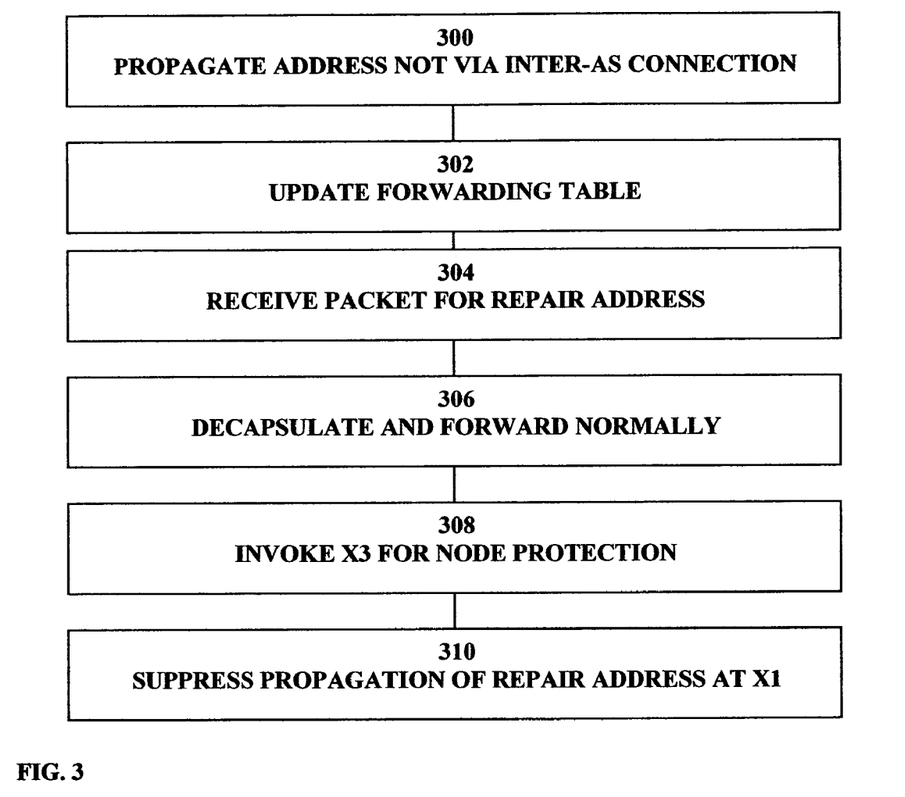
FIG. 3 is a flow diagram illustrating in more detail steps performed at a repairable ASBR.

FIG. 3 is a flow diagram showing in more detail the steps performed at a repairable ASBR such as ASBR X1 in either of a link protection or node protection mode. Turning firstly to link protection, at step 300 the repair address is propagated other than via the inter-AS connection and the forwarding instructions at ASBR X1 are updated at step 302 such that packets tunneled to the repair address and received at X1 are decapsulated and forwarded normally according to the native address of the tunnelled packet. At step 304, when packets are received for the repair address at ASBR X1 they are decapulated and forwarded normally at step 306.

In the case that ASBR X1 also wants protection against failure of itself then appropriate node protection steps can be taken. It will be noted that these steps can be implemented in addition to link protection steps such that different repair addresses are signaled for the respective eventualities in which case the repairing node can, for example, try link protection first and, if this fails, try node protection or can otherwise identify the nature of the inter-AS connection failure and select the correct repair address. Alternatively the node protection scheme can be implemented as a "failsafe" approach instead of the link protection scheme such that the repairing node will take the same action whether the link or the node has failed.

In particular at step 308 ASBR X1 operates in conjunction with a further ASBR in ASX for example ASBR X3. This may be done by signaling whereby ASBR forwards its node protection repair address to ASBR X3 to perform the subsequent repair construction steps, which may be statically configured or may be automatically implemented for each ASBR in the AS. Selection of the further ASBR may be according to any criterion, for example minimum number of hops away within the IGP, or pre-configured preferences.

At step 310 the repair address is advertised in both IBGP and eBGP but not by ASBR X1 itself. Propagation may at X1 be suppressed in any appropriate manner. For example ASBR X1 may recognize the repair address that it itself sent to ASBR X3 and suppress further propagation of it.

Figure 4:
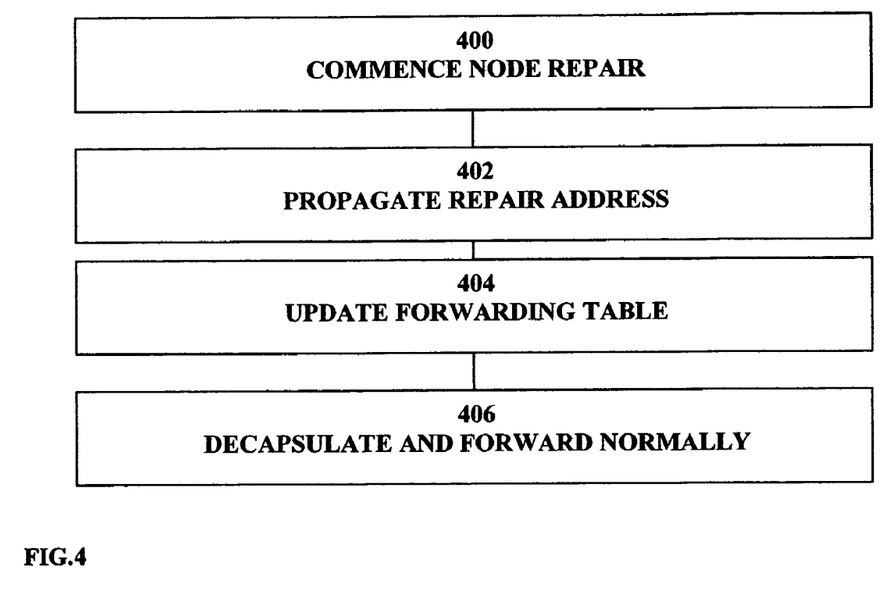
FIG. 4 is flow diagram illustrating in more detail the steps performed at a further ASBR in a common AS with the repairable ASBR.

Referring to FIG. 4 the steps performed by the further ASBR in the same AS as ASBR X1, for example X3, can be understood. At step 400 the node protection is commenced for example upon receipt of an appropriate signal and accompanying node repair address from X1. At step 402 ASBR X3 advertises the repair address in iBGP and eBGP, the address then propagating through the AS and other ASs to ASBR Y1 other than via the inter-AS to be repaired. At step 404 ASBR X3 updates its forwarding table in relation to packets tunneled to it as tunnel end point for the repair address to decapsulate such packets and forward normally. At step 406, upon receipt of packets tunneled to the node protection repair address ASBR X3 decapsulates and forwards them normally. For example where the destination of the decapsulated packet is a prefix attached to a node within the AS, the packet will reach it in the IGP. Where the destination is a prefix served by a remote AS then the packet will transit through the AS to the relevant ASBR which will then forward it on as normal.

Figure 5:
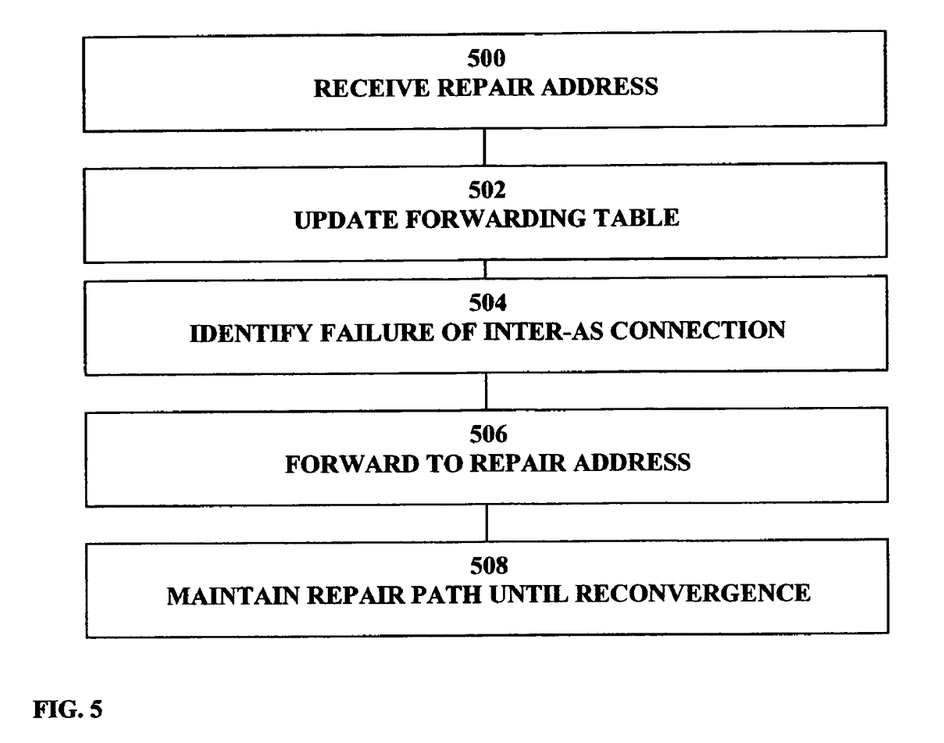
FIG. 5 is a flow diagram illustrating in more detail the steps performed at a repairing ASBR.

The steps performed at a repairing ASBR such as ASBR Y1 in the event of failure of the inter-AS connection are shown in FIG. 5. At step 500 node Y1 receives the repair address which may be either the link repair or node repair address and at step 502 ASBR Y1 updates its forwarding table appropriately. In particular Y1 is configured to recognize the repair address format as being for the purposes of repair of its inter-AS connection with node X1. This can be done in any appropriate manner for example within BGP together with an appropriate community string indicating not only the repair address, but a mapping to the repairable component. Accordingly the forwarding table is updated such that upon detection of failure of the inter-AS connection packets will be forwarded to the repair address.

At step 504 ASBR Y1 identifies failure of the inter-AS connection. This may be by any appropriate manner and ASBR Y1 may be able to distinguish between link failure and node failure for selection of the appropriate repair address or may have only one of the link or node repair address available. At step 506 node Y1 forwards packets which otherwise would have passed via the failed connection towards the repair address. Because of the manner in which IBGP and eBGP construct paths, the packets effectively pass back through the ASs through which the repair address was received. As the repair address reachability information was not sent via the failure connection, therefore, a repair path is constructed around the failure connection. At step 508 ASBR Y1 retains the repair path until BGP has re-converged. This may be detected by appropriate signaling or by waiting a pre-determined timeout period exceeding the maximum BGP convergence time as appropriate. Thereafter ASBR Y1 can forward normally relying on the re-converged network to ensure the packets reach the required destination.

The manner in which the various ASBRs can know the repair strategy can be, for example, by static configuration. For example ASBR Y1 can know that, to repair the inter-AS link or ASBR X1 it can tunnel the packet to the appropriate repair address and update its forwarding tables accordingly. Similarly node X1 can be statically configured to propagate its link repair address other than via the inter-AS link or to cooperate with the further ASBR X3 in the case of node protection, and ASBR X3 can be similarly configured. Alternatively or in addition, path computation element (PCE) can be used of the type described in draft-ietf-pce-architecture-0.5.txt incorporated herein by reference. PCE will be familiar to the skilled reader such that detailed explanation is not required here, but in general terms PCE provides an offline machine which can provide topology and other information, which is particularly of benefit if the repair is via an inter provider co-operative. Yet further, relying on the special BGP relationship that X1 and Y1 will have as peers to exchange information the relevant steps can be implemented via the peering relationship.

If the approach is not supported by all ASs then appropriate filtering can be applied to prevent the propagation of repair address information outside the cooperating ASs, although this will of course limit the availability of repairs. It will be noted that there is no need for ASs in 108 to understand what is going on (provided they can pass the repair address AND any mapping community string). If the failed node would also have provided the connectivity to the prefix then the node protection scheme will allow the packet to reach ASX, but the "natural" exit path from ASX is via the failed X1. Accordingly an appropriate "secondary" repair mechanism must be involved in this case.

The repair address itself may take any appropriate form but must be distinguishable from an ordinary address in order that it is processed appropriately at the various nodes. For example it may be a specially assigned IP address for the relevant interface of node X1 in the case of link repair or node X3 in the case of node repair. In relation to ASBR's and routers forwarding the packets tunneled to this address, they will simply treat the packet as a normal packet and send the packet along the normally computed path for the relevant IP address. However, each of the tunnel end points (for example nodes Y1 and X1 for link repair or Y1 and X3 for node repair) can recognize the repair address in any appropriate manner for example by configuration as indicated above and take the additional steps of installing the repair tunnel in their forwarding tables as a tunnel end point and, in the case of node X1, suppressing propagation of the repair address. The addresses can be any appropriate addresses for example taken from a private or restricted address space. Of course it is necessary that ASBRs recognize that the repair address entries must be inserted in the RIB and passed on, and that they can either recognize any associated community string and either act on it, passing it on unchanged, or ignore it but update the RIB anyway. Alternatively a possibility is to propagate the repair address twice, once with and once without the community string. We would also need to ensure that X1 recognized the repair address if received without the community string and STILL prevented its propagation across 106.

As a result of the arrangement described above, and in particular advertising repair addresses for an ASBR interface but not propagating it over the interface being protected a repair path is formed using the intrinsic BGP route calculation for any available repair path rather than merely adjacent ASs. As a result, there is no requirement, for example, for a redundant direct connection between ASs.

It will be appreciated that the approaches described herein can be implemented in any appropriate manner and on any appropriate platform, and the various steps described implemented in any appropriate manner for example in hardware, software or firmware. For example the approach can be implemented in any router code base supporting BGP and IS-IS or OSPF.

Any appropriate encapsulation may be used to carry a notvia repair, for example IP in IP, GRE or L2TPv3. Similarly any alternate encapsulation scheme can be adopted as long as the encapsulating router and the router to which the encapsulated packet is addressed as repair point have a common ability to process the chosen encapsulation type.

Although the discussion above is in relation to Border Gateway Protocol and its external and internal implementations, it will be recognized that the approach will apply equally to any other exterior gateway protocol (EGP) using a similar route construction technique such as a distance vector protocol.

4.0 Implementation Mechanisms—Hardware Overview

Figure 6:
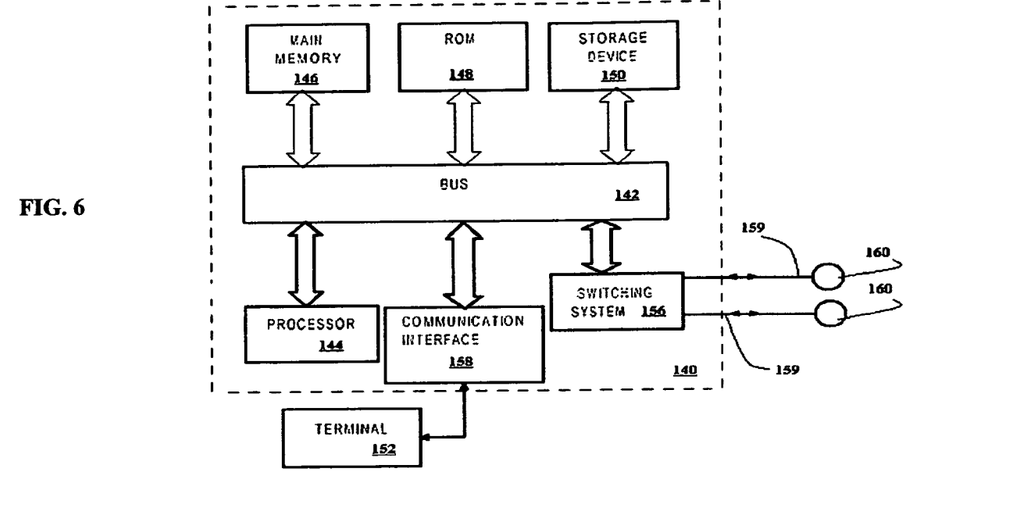
FIG. 6 is a block diagram that illustrates a computer system upon which the approach described herein may be implemented.

FIG. 6 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system implements as a router acting as an ASBR such as a repairing, repairable or further ASBR the above described method.

The computer system 140 implements as a router acting as an ASBR or repairing nodes the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet".

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

The routing domain may comprise an autonomous system, SRLG or LAN, or any other network of interconnected components sharing a common routing paradigm.

Where reference is made to BGP, eBGP or iBGP, it will be appreciated that the approach can be applied in relation to any appropriate exterior or inter-domain protocol.

It will further be appreciated that an apparatus for performing the method can be considered to be any single node such as an ASBR, repairing node or other rooter, the combination of such nodes, an AS or multiple ASs as appropriate.

What is claimed is:

1. An apparatus for constructing a repair path for use in the event of failure of an inter-Autonomous System (AS) routing connection between respective components in first and second routing domains of a data communications network, the apparatus being arranged to:

assign a propagatable repair address to a repair tunnel end point in a second Autonomous System (AS) for use in the event of failure of an inter-Autonomous System (AS) routing connection between a first AS and the second AS; and propagate the repair address to the repair tunnel end point via data communications network components other than the inter-AS routing connection to define a tunnel around the inter-AS routing connection;

wherein the propagatable repair address is an Internet Protocol (IP) address selected from an unused address space;

wherein the propagatable repair address is different from an ordinary prefix advertised for transmitting traffic via the inter-AS routing connection;

wherein the apparatus comprises one or more computing devices.

2. An apparatus as claimed in claim 1 in which the failure comprises failure of link components between the first and second routing domains.

3. An apparatus as claimed in claim 2 in which the apparatus comprises a component in one of the first and second routing domains and the repair address is propagated other than via the inter-AS routing link to the component in the other of the first and second routing domains.

4. An apparatus as claimed in claim 3 in which the apparatus comprises a repairable autonomous system border router (ASBR).

5. An apparatus as claimed in claim 1 in which the failure comprises failure of one of the connected components in the first and second routing domains.

6. An apparatus as claimed in claim 5 in which the apparatus comprises a further inter-AS routing connectable component in said one of said first and second routing domains.

7. An apparatus as claimed in claim 1 in which, where the address is propagated other than via the inter-AS routing connection from a component in one of the first and second routing domains to a component in the other of the first and second routing domains, in the event of failure, the component in the other of the first and second routing domains tunnels traffic that would have passed via the failed connection, to the repair address.

8. An apparatus as claimed in claim 1 in which the repair address is propagated via an exterior gateway protocol.

9. An apparatus as claimed in claim 8 in which the exterior gateway protocol comprises one of eBGP or iBGP.

10. A method of constructing a repair path for use in the event of failure of an inter Autonomous System (AS) routing connection between respective components in first and second routing domains of a data communications network, the method comprising:

assigning a propagatable repair address to a repair tunnel end point in a second Autonomous System (AS) for use in the event of failure of an inter-Autonomous System (AS) routing connection between a first AS and the second AS; and propagating the repair address to the repair tunnel end point via data communications network components other than the inter-AS routing connection to define a tunnel around the inter-AS routing connection;

wherein the propagatable repair address is an Internet Protocol (IP) address selected from an unused address space;

wherein the propagatable repair address is different from an ordinary prefix advertised for transmitting traffic via the inter-AS routing connection;

wherein the method is performed by one or more processors.

11. The method of claim 10 wherein the failure comprises failure of link components between the first and second routing domains.

12. The method of claim 11 wherein the repair address is propagated other than via the inter-AS routing link to a component in the other of the first and second routing domains.

13. The method of claim 12 in which the data communications network further comprises a repairable autonomous system border router (ASBR).

14. A non-transitory computer readable memory storing one or more sequences of instructions which, when executed by one or more processors, cause the one or more processors to perform:

assigning a propagatable repair address to a repair tunnel end point in a second Autonomous System (AS) for use in the event of failure of an inter-Autonomous System (AS) routing connection between respective components in a first AS and the second AS of a data communications network; and propagating the repair address to the repair tunnel end point via data communications network components other than the inter-AS routing connection to define a tunnel around the inter-AS routing connection;

wherein the propagatable repair address is an Internet Protocol (IP) address selected from an unused address space;

wherein the propagatable repair address is different from an ordinary prefix advertised for transmitting traffic via the inter-AS routing connection.

15. The non-transitory computer readable memory of claim 14, wherein the failure comprises failure of link components between the first and second routing domains.

16. The non-transitory computer readable memory of claim 15, further comprising instructions, which when executed by the one or more processors cause the one or more processors to perform: propagating the repair address other than via the inter-AS routing link to a component in the other of the first and second routing domains.

17. The non-transitory computer readable memory of claim 16 wherein the data communications network components comprise a repairable autonomous system border router (ASBR).

18. An apparatus comprising:
one or more processors; and
a network interface communicatively coupled to the one or more processors and configured to communicate one or more packet flows among the one or more processors in a network; and a computer readable medium comprising one or more sequences of instructions which, when executed by the one or more processors, cause the one or more processors to perform:

assigning a propagatable repair address to a repair tunnel end point in a second Autonomous System (AS) for use in the event of failure of an inter-Autonomous System (AS) routing connection between respective components in a first AS and the second AS of a data communications network; and propagating the repair address to the repair tunnel end point via data communications network components other than the inter-AS routing connection to define a tunnel around the inter-AS routing connection;

wherein the propagatable repair address is an Internet Protocol (IP) address selected from an unused address space;

wherein the propagatable repair address is different from an ordinary prefix advertised for transmitting traffic via the inter-AS routing connection.

19. An apparatus as claimed in claim 18 in which the failure comprises failure of link components between the first and second routing domains.

20. An apparatus as claimed in claim 19 in which the apparatus comprises a component in one of the first and second routing domains and the repair address is propagated other than via the inter-AS routing link to the component in the other of the first and second routing domains.

21. An apparatus as claimed in claim 20 in which the apparatus comprises a repairable autonomous system border router (ASBR).

22. An apparatus for constructing a repair path for use in the event of failure of an inter-AS routing connection between respective components in first and second routing domains of a data communications network, the apparatus comprising:

one or more processors;
means for assigning a propagatable repair address to a repair tunnel end point in a second Autonomous System (AS) for use in the event of failure of an inter-Autonomous System (AS) routing connection between a first AS and the second AS; and means for propagating the repair address to the repair tunnel end point via data communications network components other than the inter-AS routing connection to define a tunnel around the inter-AS routing connection;

wherein the propagatable repair address is an Internet Protocol (IP) address selected from an unused address space;

wherein the propagatable repair address is different from an ordinary prefix advertised for transmitting traffic via the inter-AS routing connection.

23. An apparatus as claimed in claim 22 in which the failure comprises failure of link components between the first and second routing domains.

24. An apparatus as claimed in claim 23 in which the apparatus comprises a component in one of the first and second routing domains and the repair address is propagated other than via the inter-AS routing link to the component in the other of the first and second routing domains.

25. An apparatus as claimed in claim 24 in which the apparatus comprises a repairable autonomous system border router (ASBR).

* * * * *